March 23, 1954    H. KATER    2,672,866
MEDICAL SYRINGE
Filed March 31, 1951    2 Sheets-Sheet 1
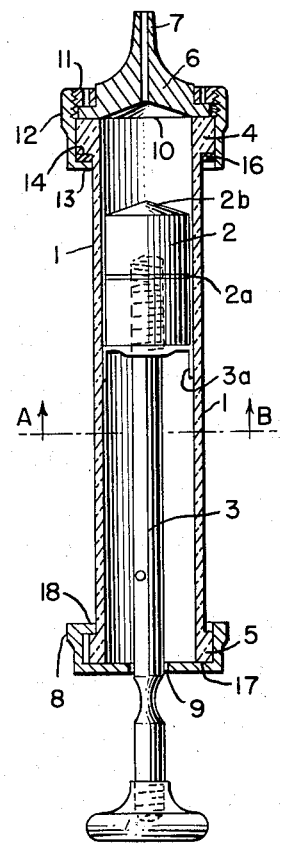
FIG. 1.
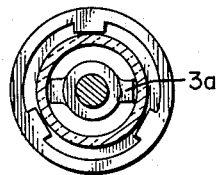
FIG. 2.
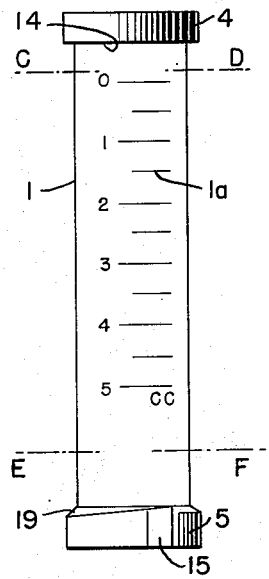
FIG. 3.
FIG. 4.
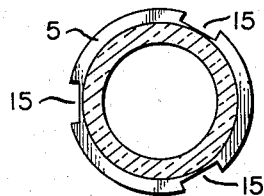
FIG. 5.
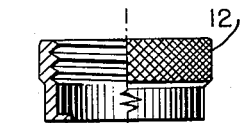
FIG. 6.
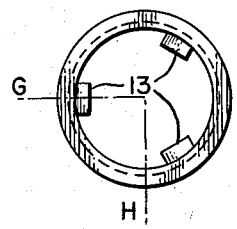
FIG. 7.
FIG. 8.
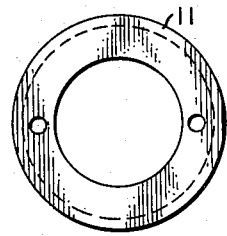
FIG. 9.
INVENTOR
HERMANN KATER
BY
ATTORNEY March 23, 1954  H. KATER  2,672,866
MEDICAL SYRINGE
Filed March 31, 1951  2 Sheets-Sheet 2
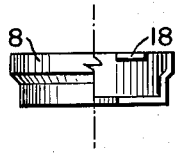
FIG.10.
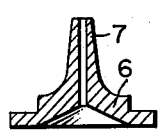
FIG.14.
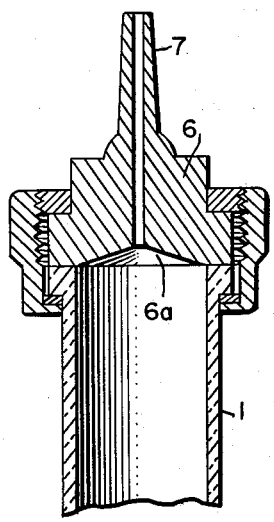
FIG.18.
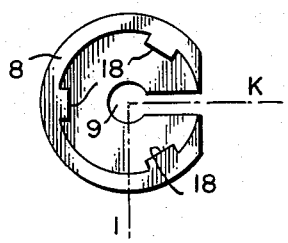
FIG.11.
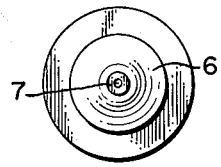
FIG.15.
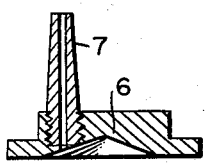
FIG.16.
FIG.19.
FIG.12.
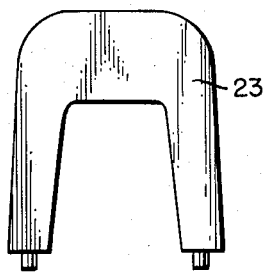
FIG.13.
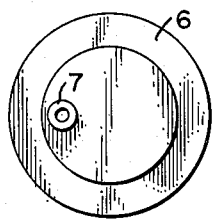
FIG.17.
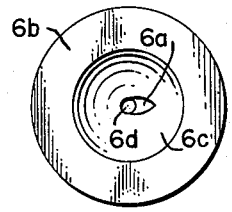
FIG.20.
INVENTOR
HERMANN KATER
BY
ATTORNEY Patented Mar. 23, 1954

2,672,866

UNITED STATES PATENT OFFICE 2,672,866

MEDICAL SYRINGE

Hermann Kater, Braunschweig, Germany

Application March 31, 1951, Serial No. 218,561

8 Claims. (Cl. 128—218)

The subject matter of the present invention is a medical syringe with a cylindrical tube consisting of transparent material, at the ends of which the necessary fittings are attached and in which a plunger is guided.

An object of the invention is to provide a syringe which can be dismantled simply and rapidly.

Another object of the invention is to facilitate by simple means a secure and fluid-tight connection, particularly between the glass cylinder and the base piece.

A further object of the invention is so to construct the syringe that all parts bounding the liquid space, particularly the cylinder and the base piece, can be made of non-metallic materials.

For the purpose of fulfilling these objects the invention consists in providing the cylindrical tube at least at one end with a collar for attaching the fittings.

The accompanying drawing shows various embodiments of the invention by way of example, and therein:

Fig. 1 is a longitudinal section through one form of medical syringe,

Fig. 2 is a section on the line A—B of Fig. 1,

Fig. 3 is an elevation of the cylindrical tube,

Fig. 4 is a section on the line C—D of Fig. 3 viewed upwards,

Fig. 5 is a section on the line E—F of Fig. 3 viewed downwards,

Fig. 6 shows a nut in section on the line G—H of Fig. 7,

Fig. 7 is a plan of the same nut,

Fig. 8 shows a screwed ring in section,

Fig. 9 is a plan of the screwed ring,

Fig. 10 shows a closing cover 8 in section on the line I—K of Fig. 11,

Fig. 11 is a plan of the closing cover,

Fig. 12 shows a key seen from the bottom for the screwed ring,

Fig. 13 is an elevation of the key,

Fig. 14 is a longitudinal section of the nozzle member with a centrally located tubule, Fig. 15 is a plan of the same, Figs. 16 and 17 are views corresponding to Figs. 14 and 15 but with eccentrically fixed tubule, Fig. 18 shows a different embodiment of a nozzle member of ceramic material with centrally located tubule, Fig. 19 shows another embodiment of a nozzle member of ceramic material with eccentrically located tubule, and Fig. 20 is a plan showing the end of the ceramic base piece of the nozzle member according to Fig. 18.

Referring first to Figs. 1 to 11, the syringe comprises a cylindrical tube 1 of glass or some other transparent and heat-proof material, such as artificial resin, a plunger 2 and a plunger rod 3. The glass tube 1 is provided at both ends with collars 4 and 5 respectively, which have the object of connecting the glass tube to the necessary fittings, namely at one end a nozzle member composed of a circular base plate 6 with tubule end 7, and at the other end a cover 8 with opening 9 for the plunger rod 3 to pass.

The base plate 6 is pressed in a tightly sealing manner on to the common end face 10 of the glass tube 1 and collar 4 by means of a threaded ring 11 and a coupling member or nut 12 screwed thereto, which by means of three lugs 13 bent inwards at right angles, engages the opposite end face 14 of the collar 4. The nut 12 is pushed on to the glass tube 1 with the lugs 13 axially over the collar 5, which has three peripheral notches 15 corresponding to the three lugs in arrangement, shape and size.

In order to prevent any breakage of the collar 4 at the application points of the lugs 13, and in order in addition to compensate for slight irregularities of the end face 14 of the collar 4, there is between the lugs 13 and the collar 4 a split washer 16 of metal. The advantage of the collar 4, in addition to the secure fixing provided for the tubule end fitting, lies in the wide annular end face 10 serving as sealing surface, especially when a base piece of non-metallic material is used, as will be later described in conjunction with Figs. 18 to 20.

The cover 8 is applied to the common end face 17 of the glass tube 1 and collar 5 and in this position engages the opposite end face 19 of the collar 5 by means of three springy lugs 18 bent inwards at right angles. The lugs 18 correspond in arrangement, shape and size with the notches 15 in the collar 5, so that on removing and replacing the cover they can be moved through these notches 15 and can be brought into the engagement position by rotation relatively to the collar 5, whereby the lugs 18 in consequence of a certain springiness and slightly chamfered contact edges effect an axial clamping of the cover 8 on to the collar 5. The collar 5 serves at the same in the use of the syringe as abutment for the first and second fingers of the user.

On the cover 8 and on the nut 12 there may be only two lugs, 18 and 13 respectively, or more than three, and correspondingly on the collar 5 there would be the same number of notches 15. On the glass tube there may be provided only the collar 4 carrying the tubule end fitting, whilst the cover may be removably attached in the manner usual in syringes to a metallic ring united to the glass tube by casting.

In any case the improved sealing effect comes into play due to the widened end face of the cylinder. Also the collar facilitates the fixing of the base piece, which consequently can in particular be made of a non-metallic material, such as a ceramic, steatite, artificial resin, or the like. Such a construction is illustrated in Figs. 18 to 20. Fig. 18 shows a central tubule and Fig. 19 an eccentric one. If in such an arrangement the plunger also is made of a suitable non-metallic material, the liquid space of the syringe has a completely non-metallic enclosure. This is of particular importance in inoculation with penicillin.

The ground-in ceramic plunger gives a substantially better sealing effect against the glass wall of the cylinder, which can be confirmed by the so-called falling time of the plunger in the empty cylinder. With the use of ceramic plungers the falling time amounts to about 90 seconds to 150 seconds.

The porosity of the ceramic material used for the base piece 6 and the plunger 2 is zero, and the hardness is such that even with the longest duration of use no wear takes place such as occurs with metal, and thus the plunger always remains fluid-tight. The coloured mark 2a on the plunger (Fig. 1) ensures a better reading of the scale 1a during the injection process. It can be placed about the middle or even at the upper edge of the plunger and thereby facilitates a higher position of the zero mark of the scale 1a. Hitherto to the edge of the face at the head end of the usual metal plunger served as mark.

By this placing of the scale 1a higher, the graduation is easier for the doctor to see, because in the previous position of the scale, the zero mark is too close above the base and often the first few marks cannot be seen.

It is important with the use of non-metallic materials for the base and plunger to prevent tiny air bubbles from remaining on those parts when the filled syringe is held by the doctor with the tubule upwards for the release of air. This object is achieved by the inventor with the use of ceramic and like materials by glazing the end face 2b of the plunger and the corresponding conical inside surface of the base piece. The sealing surfaces of these two pieces, namely the cylindrical surface of the plunger 2 and the annular surface 6b making contact with the collar 4, are ground.

The escape of air from the filled syringe can be further promoted by providing on the inner surface 6a (see Fig. 20) of the base piece a groove-like depression leading to the tubule bore.

For assembling or dismantling the syringe the key 23 shown in Figs. 12 and 13 serves, which is inserted with its turned legs in corresponding holes in the screwed ring 11.

The plunger may have on its rear side a brake spring 3a, but the movement of the plunger can also be retarded by other means, such as a brake spring fixed to the cover and engaging the plunger rod.

Figs. 14 and 15 show an alternative form of base piece with central tubule, while Figs. 16 and 17 show one with eccentric tubule.

I claim:

1. A medical syringe comprising in combination a cylindrical tube of rigid material provided at the front end thereof with a rigid flange, a nozzle member in abutting engagement with the front face of said flange, a coupling member having one end provided with an interior thread and having its other end provided with means adapted to extend behind said flange for cooperation therewith, said coupling member surrounding both said flange and said nozzle member, and nut means threadedly engaging said interior thread and adapted to be actuated so as tightly but detachably to connect said nozzle member to said tube, and said nozzle member being provided with an annular cut-out portion including an annular surface and a cylindrical surface for receiving said nut means and engaged thereby with the nut means entirely provided in the space defined by the annular surface, the cylindrical surface and the interior thread portion of the coupling member.

2. A medical syringe having a cylindrical tube provided at the front end thereof with an outwardly extending flange supporting the nozzle member of said syringe, which comprises in combination: a split washer engaging that surface of said flange which is substantially parallel to but remote from the adjacent end surface of said tube, a coupling member having one end provided with inwardly bent tongue members engaging said split washer and having its other end provided with an interior thread, said nozzle member and the front face of said flange directly engaging each other, said nozzle member and said flange being surrounded by said coupling means, said nozzle member and said tube being of non-metallic material, and nut means arranged in direct engagement with said nozzle member and threadedly engaging said interior thread, said nut means being operable to press said nozzle member against the adjacent flange surface.

3. A medical syringe having a cylindrical tube provided at the front end thereof with a flange and a nozzle member arranged for abutting engagement with the front face of said flange, which comprises in combination: a second flange integral with said tube and arranged at the rear end of said tube, a coupling member having one of its ends provided with spaced inwardly extending tongues extending behind said first mentioned flange and having its other end provided with an interior thread, said coupling member surrounding both said first mentioned flange and said nozzle member, nut means engaging said interior thread and operable tightly to connect said nozzle member to said tube, a plunger reciprocably mounted in said tube, a plunger rod extending outwardly past said second flange, said second flange being provided with channel means on the outside thereof to allow passage of said tongues when slipping said coupling means onto said tube from the last mentioned end thereof, and a closure member surrounding a portion of said plunger rod and being detachably connected to said second flange for closing the adjacent end of said tube.

4. A syringe according to claim 3, in which the closure member is provided with springy lugs bent inwardly and corresponding in number, disposition and shape to said channel means in said second flange, said lugs being so disposed that with the closure member in place a rotation of said closure member relative to said tube will bring said lugs behind said second flange to thereby hold said closure member tightly against said tube.

5. A syringe according to claim 3, in which the tube is provided with a graduation arranged for cooperation with an index mark on said plunger, said index mark being spaced from that plunger surface which faces said nozzle member.

6. A medical syringe comprising in combination: a cylindrical tube provided at the front end thereof with a flange, a nozzle member arranged in abutting engagement with the front face of said flange, a coupling member having one end provided with an interior thread and having its other end provided with means adapted to extend behind said flange for cooperation therewith, said coupling member surrounding both said flange and said nozzle member, nut means threadedly engaging said interior thread and adapted to be actuated so as tightly but detachably to connect said nozzle member to said tube, and a plunger of ceramic material reciprocally mounted in said tube and having that end surface glazed which faces said nozzle member.

7. A medical syringe comprising in combination: a cylindrical tube provided at the front end thereof with a flange, a nozzle member including a cylindrical base portion, said flange having a plane front face, said base portion of the nozzle member being in abutting engagement with said front face of the flange, said base portion of the nozzle member being made of a ceramic material, the surface of said base portion facing the interior of said tube being glazed, a coupling member having one end provided with an interior thread and having its other end provided with means adapted to extend behind said flange for cooperation therewith, said coupling member surrounding both said flange and said nozzle member, and nut means threadedly engaging said interior thread and adapted to be actuated so as tightly but detachably to connect said nozzle member to said tube.

8. A medical syringe comprising in combination: a cylindrical tube provided at the front end thereof with a flange, a nozzle member including a cylindrical base portion, said flange having a plane front face, said base portion of the nozzle member being in abutting engagement with said front face of the flange, said nozzle member having an outlet eccentrically arranged to the longitudinal axis of the nozzle member, the surface of said base portion of the nozzle member facing the interior of said tube having a groove radially extending from its center and communicating with said outlet, a coupling member having one end provided with an interior thread and having its other end provided with means adapted to extend behind said flange for cooperation therewith, said coupling member surrounding both said flange and said nozzle member, and nut means threadedly engaging said interior thread and adapted to be actuated so as tightly but detachably to connect said nozzle member to said tube.

HERMANN KATER.

References Cited in the file of this patent

UNITED STATES PATENTS

| Number | Name | Date |
|---|---|---|
| 1,155,012 | Slee | Sept. 28, 1915 |
| 1,388,946 | Goold | Aug. 30, 1921 |

FOREIGN PATENTS

| Number | Country | Date |
|---|---|---|
| 303,571 | Germany | Feb. 6, 1918 |
| 382,018 | Germany | Sept. 27, 1923 |
| 541,157 | Great Britain | Nov. 14, 1941 |